(12) United States Patent
Yu et al.

(10) Patent No.: US 12,525,675 B2
(45) Date of Patent: Jan. 13, 2026

(54) BATTERY PROTECTION DEVICE AND ELECTRIC VEHICLE

(71) Applicant: HONDA MOTOR CO., LTD., Tokyo (JP)

(72) Inventors: Jianli Yu, Guangzhou (CN); Koji Yoshikawa, Guangzhou (CN); Doudou Wang, Guangzhou (CN); Nobuo Aizawa, Guangzhou (CN)

(73) Assignee: HONDA MOTOR CO., LTD., Tokyo (JP)

( * ) Notice: Subject to any disclaimer, the term of this patent is extended or adjusted under 35 U.S.C. 154(b) by 335 days.

(21) Appl. No.: 18/195,955

(22) Filed: May 11, 2023

(65) Prior Publication Data
US 2023/0369699 A1 Nov. 16, 2023

(30) Foreign Application Priority Data
May 12, 2022 (CN) .......................... 202210515978.6

(51) Int. Cl.
*B60K 1/04* (2019.01)
*B60L 50/64* (2019.01)
*H01M 50/242* (2021.01)
*H01M 50/249* (2021.01)

(52) U.S. Cl.
CPC ............ *H01M 50/242* (2021.01); *B60K 1/04* (2013.01); *B60L 50/64* (2019.02); *H01M 50/249* (2021.01); *H01M 2220/20* (2013.01)

(58) Field of Classification Search
CPC ............ H01M 50/242; H01M 50/249; H01M 2220/20; B60L 50/64; B60K 1/04
USPC .......................................................... 180/68.5
See application file for complete search history.

(56) References Cited

U.S. PATENT DOCUMENTS

| 11,919,381 | B2 * | 3/2024 | Matsuoka | ............... B60L 50/66 |
| 2011/0083923 | A1 * | 4/2011 | Ajisaka | .................. B62D 21/06 180/291 |
| 2018/0370577 | A1 * | 12/2018 | Takahashi | ................ B60K 1/04 |
| 2022/0158283 | A1 * | 5/2022 | Ueno | ................... H01M 50/249 |
| 2022/0185090 | A1 * | 6/2022 | Matsuoka | ............. B62D 27/023 |
| 2023/0291050 | A1 * | 9/2023 | Tang | .................. B62D 25/2027 |

FOREIGN PATENT DOCUMENTS

CN 113858931 A * 12/2021 ............... B60K 1/04

OTHER PUBLICATIONS

CN 113858931A accessed at www.espacenet.com on Jun. 8, 2025 (Year: 2021).*

* cited by examiner

*Primary Examiner* — James A Shriver, II
*Assistant Examiner* — Hilary L Johns
(74) *Attorney, Agent, or Firm* — Amin, Turocy & Watson, LLP

(57) ABSTRACT

A battery protection device installed in a vehicle, wherein the vehicle includes a vehicle body and a battery pack arranged inside the vehicle body is provided, wherein the battery protection device includes a vehicle body reinforcing structure provided to extend along a length direction of either side surface of the battery pack, two ends of the vehicle body reinforcing structure are fixed to the vehicle body respectively; and a battery protection structure that extends along the length direction of either side surface of the battery pack and is installed on a side of the vehicle body reinforcing structure far from the battery pack.

13 Claims, 2 Drawing Sheets

BATTERY PROTECTION DEVICE AND ELECTRIC VEHICLE

CROSS-REFERENCE TO RELATED APPLICATION

The priority is claimed based on a Chinese Patent Application No. 202210515978.6, filed May 12, 2022. The content of the Chinese Patent Application is incorporated herein by reference.

TECHNICAL FIELD

The present disclosure relates to a technical field of a vehicle. More specifically, the present disclosure relates to a battery protection device and an electric vehicle.

RELATED ART

Conventionally, along with the rapid development of the vehicle industry, due to the advantages of fast response, energy saving and emission reduction, the electric vehicles are gradually gaining the recognition of more consumers. The power of the electric vehicles comes from the battery pack, and with the continuous improvement of the cruising range, the volume of the battery pack becomes larger such that the battery pack is usually arranged at the bottom portion of the vehicle body in most models of the vehicles.

Since the battery pack is arranged at the bottom portion of the vehicle body, it is easy for the housing of the battery pack to be hit by a protruding object on the ground. If the housing of the battery pack is deformed or damaged due to the collision, it is easy for the electric cores inside the housing to be damaged so as to affect the usage stability of the battery pack. In order to protect the battery pack, a battery protection structure is provided on the side surface of the battery pack in some vehicle models and the battery protection structure is connected with the battery pack. When the battery pack with the battery protection structure is hit by the protruding object, the battery protection structure at the outside of the battery pack is hit at first such that the impact energy transmitted to the battery pack is reduced.

However, the battery protection structure is directly connected to the battery pack such that when the battery protection structure is hit, the impact energy can be directly transmitted to the battery pack and the suitable buffering effect may not be achieved.

SUMMARY

In consideration of the above circumstances, an object of the present disclosure is to provide a battery protection device and an electric vehicle for solving the technical issue that the suitable buffering effect may not be achieved since the battery protection device is directly connected with the battery pack in the conventional technology.

According to a first aspect of the present disclosure, a battery protection device installed in a vehicle including a vehicle body and a battery pack arranged inside the vehicle body is provided, the battery protection device includes a vehicle body reinforcing structure provided to extend along a length direction of either side surface of the battery pack, two ends of the vehicle body reinforcing structure are fixed to the vehicle body respectively; and a battery protection structure that extends along the length direction of either side surface of the battery pack and is installed on a side of the vehicle body reinforcing structure far from the battery pack.

According to the above-described aspect, the battery protection device is applied in the vehicle, wherein the vehicle body reinforcing structure is installed on the side surface of the battery pack, the vehicle body reinforcing structure is connected with the vehicle body, and the battery protection structure is arranged at the side of the vehicle body reinforcing structure being far from the battery pack. Accordingly, when the vehicle encounters the protruding object on the ground during the driving, the protruding object collides with the battery protection structure at first before colliding with the battery pack. The battery protection structure will be deformed after receiving the impact due to the collision with the protruding object to absorb part of the impact energy. When the impact energy is transmitted to the vehicle body reinforcing structure via the battery protection structure, on one hand, the vehicle body reinforcing structure transmits part of the impact energy to the vehicle body, and on the other hand, the vehicle body reinforcing structure is deformed due to the impact so as to further absorb the impact energy. In other words, before the impact energy is transmitted to the battery pack, the impact energy is partly absorbed by the battery protection structure to be weaken and the weaken impact energy is partly dispersed to the vehicle body at the vehicle body reinforcing structure and partly absorbed by the vehicle body reinforcing structure. Accordingly, the impact energy transmitted to the battery pack is further weaken so as to achieve a suitable buffering effect with respect to the battery pack, and thus the arrangement of the battery protection device realizes the better protection effect with respect to the battery pack.

According to an optional aspect, the vehicle body reinforcing structure may include a first reinforcing structure and a second reinforcing structure, and at least one of the first reinforcing structure and the second reinforcing structure may be arranged to communicate with the battery protection structure.

According to the above-described aspect, the battery protection structure may only communicate with either of the first reinforcing structure or the second reinforcing structure so as to transmit the impact energy to the vehicle body through the first reinforcing structure or the second reinforcing structure communicated with the battery protection structure. On the other hand, the battery protection structure may communicate with the first reinforcing structure and the second reinforcing structure so as to increase the connection points between the battery protection structure and the vehicle body reinforcing structure and make the impact energy to be further dispersed during the transmission to improve the buffering effect.

According to an optional aspect, the battery protection device may further include a first support member, a first end of the first support member may communicate with the battery protection structure, and a second end of the first support member may communicate with at least one of the first reinforcing structure and the second reinforcing structure.

According to the above-described aspect, the arrangement of the first support member further increases the connection points between the battery protection structure and the vehicle body reinforcing structure so as to further increase the transmission points of the impact energy and improve the structural strength of the battery protection device.

According to an optional aspect, the battery protection device may further include a second support member, a first end of the second support member may communicate with the battery protection structure, and a second end of the second support member may communicate with at least one of the first reinforcing structure and the second reinforcing structure.

According to the above-described aspect, the second support member is further provided in addition to the first support member to further increase the connection points between the battery protection structure and the vehicle body reinforcing structure so as to further increase the transmission points of the impact energy and improve the structural strength of the battery protection device.

According to an optional aspect, projections of side surfaces of at least one of the first support member and the second support member, the battery protection structure and the vehicle body reinforcing structure may encircle to form a triangular shape.

According to the above-described aspect, the arrangement positions of the first support member and/or the second support member make the projections of the side surfaces of the battery protection device to encircle to form the triangular shape, and the triangular shape has a better stability so as to improve the stability of the battery protection device.

According to an optional aspect, the first support member and/or the second support member may include a reinforcing rib.

According to the above-described aspect, the arrangement of the reinforcing rib improves the structural strength of the first support member and/or the second support member in which the reinforcing rib is provided so as to improve the structural stability.

According to an optional aspect, the first reinforcing structure may include at least a cross-connection portion, the second reinforcing structure may include at least a reinforcing portion provided to extend along the length direction of one side surface of the battery pack, and the second reinforcing structure may be positioned at a lower side of the first reinforcing structure.

According to the above-described aspect, the arrangement of the first reinforcing structure and the second reinforcing structure in the up-down direction makes the covering area of the vehicle body reinforcing structure on the side surface of the battery pack becomes relatively wider to enlarge the protection range with respect to the battery pack. At the same time, due to the combined effect of the cross-connection portion and the reinforcing portion, it is possible for the vehicle body reinforcing structure to improve the structural strength of the vehicle body.

According to an optional aspect, the battery protection structure may include an central section extending along the length direction of the battery pack and two side sections extending from two ends of the central section toward a direction of the battery pack respectively, and the central section and the two side sections may form a U-shaped structure.

According to the above-described aspect, the battery protection structure is formed in the U-shaped structure so as to increase the distance between the central section thereof with the battery pack to increase the buffering space and improve the buffering effect.

According to an optional aspect, the two side sections may be arranged from the two ends of the central section to be inclined in a direction from a lower side toward an upper side to approach the battery pack.

According to the above-described aspect, the inclination arrangement of the side sections makes the battery protection structure to be inclined toward the lower side with respect to the battery pack. Since when the vehicle is moving forward or reversing, most of the impact energy of the protruding objects on the ground with respect to the battery protection structure is in the front-rear direction, the battery protection structure installed in the inclination arrangement can increase the collapse space in the direction of the impact energy.

According to an optional aspect, the battery protection structure may include a weight-reduction cavity.

According to the above-described aspect, the arrangement of the weight-reduction cavity can reduce the weight of the battery protection structure so as to reduce the gross weight of the electric vehicle. Furthermore, due to the arrangement of the weight-reduction cavity inside the battery protection structure, it is possible to increase the deformation amount of the battery protection structure at the time of receiving the impact energy, that is, to increase the absorbed energy when the impact is applied to the battery protection structure so as to improve the buffering effect by the battery protection structure.

According to an optional aspect, a horizontal plane on which the lowest point of the battery protection structure is positioned may be at a lower side of a horizontal plane on which the lowest point of the battery pack is positioned.

According to the above-described aspect, the horizontal plane on which the lowest point of the battery protection structure is positioned is at a lower side of a horizontal plane on which the lowest point of the battery pack is positioned such that when the collision due to the protruding object on the ground with respect to the bottom portion of the vehicle body occurs, the battery protection structure is closer to the ground to be impacted before the batter pack so as to improve the effectiveness of the battery protection structure to protect the battery pack.

According to a second aspect of the present disclosure, an electric vehicle including a vehicle body; and a battery pack installed inside the vehicle body, wherein the electric vehicle further includes the battery protection device according to the first aspect is provided.

According to the second aspect of the present disclosure, the electric vehicle includes the battery protection device according to the first aspect, the battery protection device provides the better buffering effect with respect to the battery pack such that it is possible to protect the battery pack more suitably. More specifically, the battery protection device is applied in the vehicle, wherein the vehicle body reinforcing structure is installed on the side surface of the battery pack, the vehicle body reinforcing structure is connected with the vehicle body, and the battery protection structure is arranged at the side of the vehicle body reinforcing structure being far from the battery pack. Accordingly, when the vehicle encounters the protruding object on the ground during the driving, the protruding object collides with the battery protection structure at first before colliding with the battery pack. The battery protection structure will be deformed after receiving the impact due to the collision with the protruding object to absorb part of the impact energy. When the impact energy is transmitted to the vehicle body reinforcing structure via the battery protection structure, on one hand, the vehicle body reinforcing structure transmits part of the impact energy to the vehicle body, and on the other hand, the vehicle body reinforcing structure is deformed due to the impact so as to further absorb the impact energy. In other words, before the impact energy is transmitted to the battery pack, the impact energy is partly absorbed by the battery protection structure to be weaken and the weaken impact energy is partly dispersed to the vehicle body at the vehicle body reinforcing structure and partly absorbed by the vehicle body reinforcing structure. Accordingly, the impact energy transmitted to the battery pack is further weaken so as to achieve a suitable buffering effect with respect to the battery pack, and thus the arrangement of the battery protection device realizes the better protection effect with respect to the battery pack.

DESCRIPTION OF EMBODIMENTS

Figure 1:
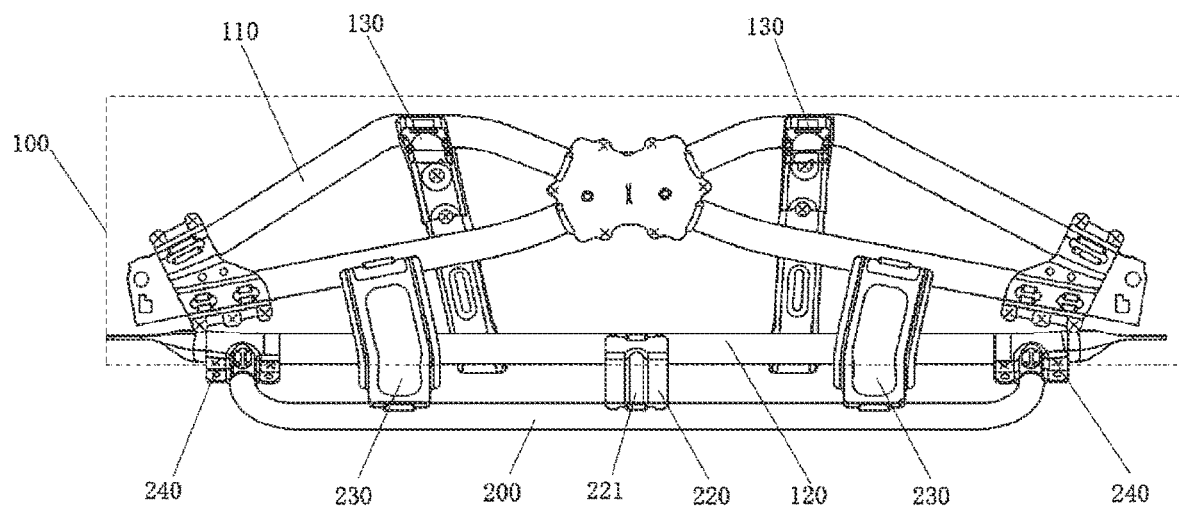
FIG. 1 is a schematic view showing an assembly of a vehicle body reinforcing structure and a battery protection structure in an electric vehicle from a first angle view according to an embodiment of the present disclosure.

In order to make the technical solutions according to the embodiments of the present disclosure to be clearly described, hereinafter, the drawings being necessary in the embodiments and examples of the present disclosure will be briefly described. Hereinafter, the configurations described in the drawings in the following embodiments are only specific examples of the present disclosure, and a person with ordinary skill in the art can achieve other drawings based on the enclosed drawings of the present disclosure.

In order to more clearly describe the technical solutions and effects according to the present disclosure, hereinafter, the present disclosure will be further described in details with the drawings and embodiments. It is noted that the specific embodiments described below are only used to explain the present disclosure rather than limiting the present disclosure.

In the following description, unless otherwise defined, when a member is "fixed to" or "arranged on" another member, the member may be directly on or indirectly on the other member. When the member is "connected" to another member, the member may be directly connected to or indirectly connected to the other member.

In the description of the present disclosure, it is noted that the orientation or positional relationship indicated by the terms "up", "down", "front", "rear", "left", "right", "vertical", "horizontal", "top", "bottom", "inside", "outside" and the like indicate the orientation or the positional relationship based on the orientation when the vehicle is positioned in the horizontal side. Such orientation or the positional relationship are used only for the convenience of describing the present disclosure and simplifying the description. Such terms cannot be interpreted to indicate or imply that the specified device or member has to be configured with the specified orientation or operated with the specified orientation, and such terms cannot be considered to be the limitation to the present disclosure.

The terms "first" and "second" are only used for making the description easy to understand, and they cannot be interpreted to indicate or imply the importance of the configurations or imply the amount of the technical features. Thus, the features being limited by the terms as "first" or "second" may indicate or imply one feature or more features. In the description of the present disclosure, unless otherwise defined, the term "a plurality of" means that an amount is equal to two or more than two. Furthermore, unless otherwise defined, the term "some" means that an amount is equal to one or more than one.

In the description of the present disclosure, unless otherwise defined, it is noted that the terms "install", "communicate", and "connect" should be broadly understood. For example, according to such terms, it is possible to perform a fixedly connection, or a detachably connection, or an integrally connection. Also, a mechanical connection may be performed while an electrical connection may be performed. Furthermore, a direct connection, an indirect connection via an intermediate media, or a connection connecting the inside of two elements may be performed. For a person with ordinary skill in the art, the specific meaning of the above-mentioned terms may be suitably understood according to the actual situation.

In the description of the present disclosure, the terms of referring to "an embodiment", "some embodiment", or "embodiments" mean that one embodiment or multiple embodiments of the present disclosure include the specified features, structure, or characteristic described according to the embodiments. Accordingly, unless specifically emphasized otherwise, the terms "in one embodiment", "in some embodiments", "in other embodiments", or the like that appear in various paragraphs in this specification does not necessarily all refer to the same embodiment, however, such terms mean "one or more embodiments but not all of the embodiments". Additionally, in one or more embodiments, the features, structure, and the characteristic may be combined in any appropriate manner.

The present disclosure will be described by referring to the enclosed drawings and embodiments shown below.

As shown in FIG. 1, a battery protection device according to an embodiment of the present disclosure is provided, wherein the battery protection device is applied in the vehicle and the vehicle may be a hybrid vehicle or a pure electric vehicle. The vehicle includes a vehicle body and a battery pack, wherein the battery pack is arranged inside the vehicle body and the battery protection device is installed in the vehicle body. The battery protection device includes a vehicle body reinforcing structure 100 and a battery protection structure 200. The vehicle body reinforcing structure 100 is provided on the side surface of the battery pack and the vehicle body reinforcing structure 100 extends along a length direction of either side surface of the battery pack. Two ends of the vehicle body reinforcing structure 100 are fixed to the vehicle body respectively, and the battery protection structure 200 is installed at the side of the vehicle body reinforcing structure 100 being far from the battery pack.

The vehicle body reinforcing structure 100 is arranged on the side surface of the battery pack and the battery protection structure 200 is installed on the side of the vehicle body reinforcing structure 100 that is far from the battery pack 100. Thus, at the time of encountering the obstacle object (for example, the protruding object on the ground) moving from the lateral side toward the battery pack, the configuration colliding with the obstacle object is the battery protection structure 200. When the impact energy is relatively small, the battery protection structure 200 resists the impact energy by the structural strength of the battery protection structure 200 itself so as to block the transmission of the impact energy further to the direction of the battery pack. When the impact energy is relatively large, the battery protection structure 200 will be collapsed and deformed after receiving the impact to absorb part of the impact energy such that the impact energy transmitted to the vehicle body reinforcing structure 100 is relatively weaken and the vehicle body reinforcing structure 100 resists the impact energy by the structural strength of the vehicle body reinforcing structure 100 itself so as to block the transmission of the impact energy further to the direction of the battery pack. When the impact energy is further larger, before the impact energy is transmitted to the battery pack, the battery protection structure 200 and the vehicle body reinforcing structure 100 are respectively collapsed to absorb part of the impact energy so as to significantly weaken the impact energy transmitted to the battery pack, and thus protect the battery pack more suitably.

In the vehicle, the vehicle body reinforcing structure 100 may be installed on either side of the battery pack. For example, the vehicle body reinforcing structure 100 may be installed on the front side, rear side, left side, right side, upper side, and the lower side of the battery pack. During the driving of the vehicle, since the movement velocity of driving forward or reversing is relatively larger than other situations and it is considerable that the impact energy received by the battery pack will be relatively larger, the vehicle body reinforcing structure 100 will be preferably installed on the front side or the rear side of the battery pack.

According to an example, the battery pack is installed at the bottom side of the rear portion of the vehicle body. The vehicle body reinforcing structure 100 is arranged at the rear side of the battery pack, and the vehicle body reinforcing structure 100 extends along the left-right direction of the battery pack. The left end and the right end of the vehicle body reinforcing structure 100 are connected to the left side and the right side of the vehicle body. According to this arrangement, it is possible for the vehicle body reinforcing structure 100 to disperse part of the impact energy to the vehicle body through the connection with the vehicle body to further protect the battery pack.

According to an example, the vehicle body reinforcing structure 100 does not communicate with the battery pack. At this time, the transmission chain of the impact energy is from the battery protection structure 100 to the vehicle body reinforcing structure 100, the vehicle body, and the battery pack in this sequence. Compared with the configuration of directly connecting the battery pack with the battery protection structure according to the conventional technology, the battery protection device provided in the present embodiment can extend the transmission chain of the impact energy to make the impact energy to be absorbed during the transmission chain so as to achieve the goal of improving the protection effect of the battery protection device with respect to the battery pack.

According to an example, the vehicle body reinforcing structure 100 is connected with the battery pack. In other words, the vehicle body reinforcing structure 100 is connected with the vehicle body and the battery pack respectively. When the impact energy is transmitted to the vehicle body reinforcing structure, the vehicle body reinforcing structure transmits the impact energy to the vehicle body and the battery pack respectively. According to this arrangement, on one hand, at this time, the transmission chain of the impact energy is from the battery protection structure 200 to the vehicle body reinforcing structure 100, the vehicle body, and the battery pack in this sequence. By indirectly connecting the battery pack and the battery protection structure 200, compared with the configuration of directly connecting the battery pack and the battery protection structure according to the conventional technology, the battery protection device provided in the present embodiment can extend the transmission chain of the impact energy to make the impact energy to be absorbed during the transmission chain so as to achieve the goal of improving the protection effect of the battery protection device with respect to the battery pack. On the other hand, the stability of the connection of the battery pack can be improved by the connection between the vehicle body reinforcing structure 100 and the battery pack so as to avoid the collision from occurring between the battery pack and the vehicle body due to the shaking of the battery pack with respect to the vehicle body.

Figure 2:
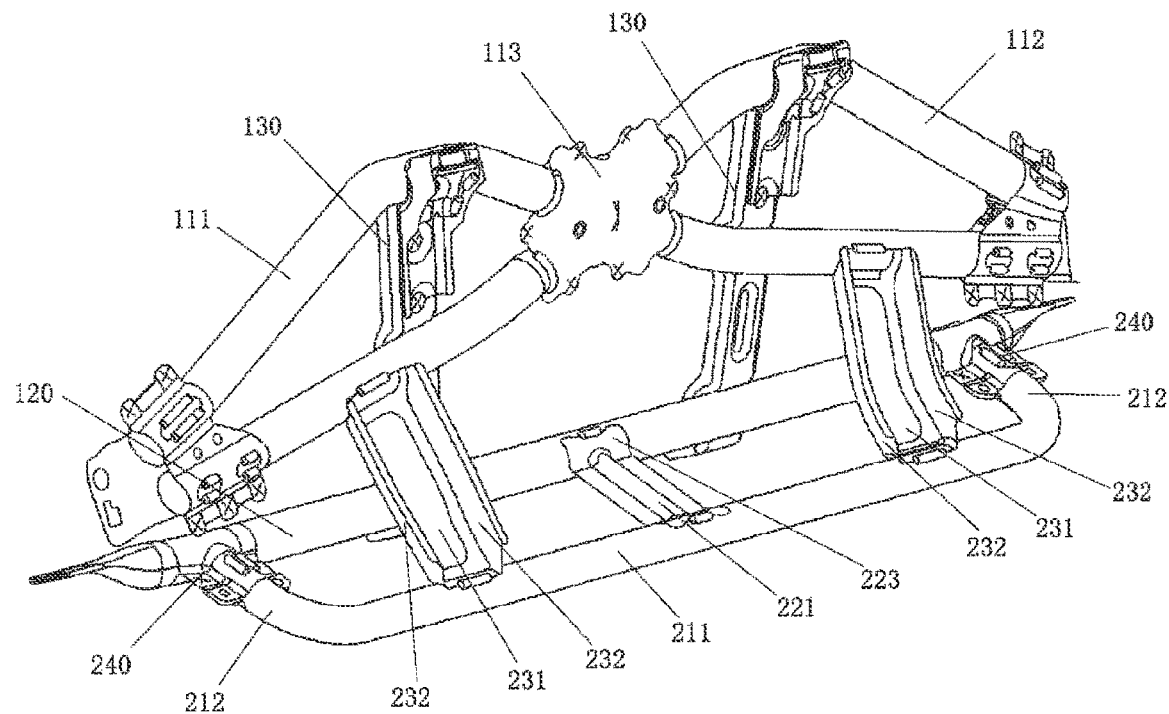
FIG. 2 is a schematic view showing the assembly of the vehicle body reinforcing structure and the battery protection structure in the electric vehicle from a second angle view according to the embodiment of the present disclosure.
Figure 3:
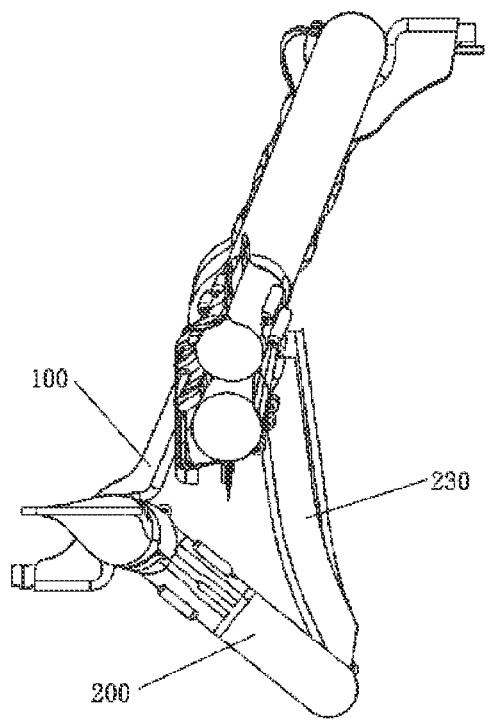
FIG. 3 is a schematic view showing the assembly of the vehicle body reinforcing structure and the battery protection structure in the electric vehicle from a third angle view according to the embodiment of the present disclosure.

As shown in FIG. 1 to FIG. 3, according to an example, the vehicle body reinforcing structure 100 includes a first reinforcing structure 110 and a second reinforcing structure 120, and at least one of the first reinforcing structure 110 and the second reinforcing structure 120 is connected with the battery protection structure 200. In other words, the battery protection structure 200 may be only connected with the first reinforcing structure 110, or the battery protection structure 200 may be only connected with the second reinforcing structure 120, and the battery protection structure 200 may be respectively connected to the first reinforcing structure 110 and the second reinforcing structure 120.

According to a specific arrangement, two ends of the first reinforcing structure 110 are connected with the two sides of the vehicle body respectively, and two ends of the second reinforcing structure 120 are connected with the two sides of the vehicle body respectively. For example, the left end and the right end of the first reinforcing structure 110 are connected with the left side and the right side of the vehicle body respectively, and the left end and the right end of the second reinforcing structure 120 are connected with the left side and the right side of the vehicle body respectively.

The first reinforcing structure 110 and the second reinforcing structure 120 may be distributed in the front-rear direction, or the first reinforcing structure 110 and the second reinforcing structure 120 may be distributed in the up-down direction. According to other examples, the first reinforcing structure 110 and the second reinforcing structure 120 may be distributed to be inclined with respect to the battery pack, that is, the minimum distance between the first reinforcing structure 110 and the battery pack is different from the minimum distance between the second reinforcing structure 120 and the battery pack.

According to a specific example, both the vehicle body reinforcing structure 100 and the battery protection structure 200 are arranged at the rear side of the battery pack. As shown in FIG. 2, the first reinforcing structure 110 and the second reinforcing structure 120 are distributed in the up-down direction, the second reinforcing structure 120 is provided at the lower side of the first reinforcing structure 110, and the batter protection structure 200 is connected with the second reinforcing structure 120. That is, the connection point of the battery protection structure 200 and the vehicle body reinforcing structure 100 is positioned at a position that is relatively closer to the lower side in the vehicle body reinforcing structure 100. The battery protection structure 200 is configured to mainly buffer the impact that may be received by the region at the lower side of the battery pack. Thus, by installing the battery protection structure 200 at the position that is relatively closer to the lower side in the vehicle body reinforcing structure 100, it is possible to make the distance between the connection portion of the battery protection structure 200 and the vehicle body reinforcing structure 100 and the portion of the battery protection structure 200 where it is most likely to receive the impact in the battery protection structure 200 to be relatively shorter than that in other situations so as to improve the connection stability of the battery protection structure 200.

As shown in FIG. 1, according to an example, the two ends of the battery protection structure 200 are connected to the two ends of the vehicle body reinforcing structure 100, respectively. As an example, when the battery protection structure 200 is installed at the rear side of the battery pack, the battery protection structure 200 extends along the length direction of the rear surface of the battery pack. In other words, the battery protection structure 200 extends along the left-right direction, and the left end and the right end of the battery protection structure 200 are connected to the left end and the right end of the second reinforcing structure 120 respectively. According to such an arrangement, when the battery protection structure 200 receives the collision, the battery protection structure 200 is collapsed and at the same time, the impact energy is dispersed to the left side and the right side when being transmitted inside the battery protection structure 200. The impact energy is transmitted to the second reinforcing structure 120 through the connection portions at the left side and the right side so as to make the force received by the vehicle body reinforcing structure 100 at a single point to be relatively smaller.

According to an example, the first reinforcing structure 110 at least includes a cross-connection portion 113, and the second reinforcing structure 120 at least includes a reinforcing portion provided to extend along the length direction of one side surface of the battery pack. The second reinforcing structure 120 is positioned at the lower side of the first reinforcing structure 110.

According to an example, the first reinforcing structure 110 is connected with the second reinforcing structure 120 to improve the overall structural strength of the vehicle body reinforcing structure 100 such that it is possible for the vehicle body reinforcing structure 100 to resist a larger impact energy. The two ends of the first reinforcing structure 110 may be connected to the two ends of the second reinforcing structure 120, respectively. The two ends after the first reinforcing structure 110 and the second reinforcing structure 120 are connected are connected to the two sides of the vehicle body, respectively.

According to another example, the battery protection device further includes a connection bracket 130, wherein the two ends of the first reinforcing structure 110 are connected to the two sides of the vehicle body, and the two ends of the second reinforcing structure 120 are connected to the two sides of the vehicle body. The first reinforcing structure 110 and the second reinforcing structure 120 are connected with each other via the connection bracket 130, and the connection bracket 130 is connected with the vehicle body. According to such an arrangement, on one hand, the connection bracket 130 connects the first reinforcing structure 110 with the second reinforcing structure 120, and on the other hand, the connection bracket 130 increases the connection points between the vehicle body reinforcing structure 100 and the vehicle body. Accordingly, the connection bracket 130 improves the connection stability of the battery protection device and the vehicle body and increases the transmission points for the battery protection device to transmit the impact energy to the vehicle body. Furthermore, the connection bracket 130 may be configured to connect the battery pack so as to avoid the shaking of the battery pack and improves the stability of the battery pack during the driving of the vehicle.

As shown in FIG. 1, according to an example, the battery protection structure 200 further includes a first support member 220, wherein the first support member 220 is connected with the battery protection structure 200, and the first support member 220 is connected with at least one of the first reinforcing structure 110 and the second reinforcing structure 120. In other words, the first support member 220 may be connected to the battery protection structure 200 and the first reinforcing structure 110 respectively, or the first support member 220 may be connected to the battery protection structure 200 and the second reinforcing structure 120 respectively, or the first support member 220 may be connected to the battery protection structure 200, the first reinforcing structure 110 and the second reinforcing structure 120 respectively. According to such an arrangement, at the connection portion of the battery protection structure 200 and the vehicle body reinforcing structure 100, besides the two connection portions at the two ends of the battery protection structure 200, at least one connection point is increased between the battery protection structure 200 and the vehicle body reinforcing structure 100 due to the arrangement of the first support member 220. Accordingly, at least one transmission point for transmitting the impact energy is increased so as to further disperse the impact energy transmitted to the vehicle body reinforcing structure 100. Thus, when the collision occurs, the vehicle body reinforcing structure can resist a relatively larger impact energy so as to improve the protection effect with respect to the battery pack. As an example, the connection point of the first support member 200 is positioned at the end portion, wherein one end of the first support member is connected with the battery protection structure 200, and the other end thereof is connected with at least one of the first reinforcing structure 110 and the second reinforcing structure 120.

Furthermore, the battery protection device further includes a second support member 230, wherein the second support member 230 is connected with the battery protection structure 200, the second support member 230 is connected with at least one of the first reinforcing structure 110 and the second reinforcing structure 120. As an example, the connection point of the second support member 230 is positioned at the end portion thereof, wherein one end of the second support member 230 is connected with the battery protection structure 200, and the other end of the second support member 230 is connected with at least one of the first reinforcing structure 110 and the second reinforcing structure 120.

In other words, when the battery protection device includes both the first support member 220 and the second support member 230, either of the first support member 220 and the second member 230 has one end that is connected with the battery protection structure 200, and there are several possible arrangements among the other end of the first support member 220, the other end of the second support member 230, the first reinforcing structure 110, and the second reinforcing structure 120 at least as shown below.

The first arrangement is that the first support member 220 is connected with the first reinforcing structure 110, and the second support member 230 is connected with the second reinforcing structure 120.

The second arrangement is that the first support member 220 is connected with the second reinforcing structure 120, and the second support member 230 is connected with the first reinforcing structure 110.

The third arrangement is that the first support member is connected with the first reinforcing structure 110, and the second support member 230 is connected with the first reinforcing structure 110 and the second reinforcing structure 120 respectively.

The fourth arrangement is that the first support member 220 is connected with the second reinforcing structure 120, and the second support member 230 is connected with the first reinforcing structure 110 and the second reinforcing structure 120 respectively.

The fifth arrangement is that the first support member 220 is connected with the first reinforcing structure 110 and the second reinforcing structure 120 respectively, and the second support member is connected with the first reinforcing structure 110 and the second reinforcing structure 120 respectively.

According to the variable arrangements shown above, the second support member 230 is added to further increase the connection points between the battery protection structure 200 and the vehicle body reinforcing structure 100 so as to further increase the transmission points of the impact energy. Accordingly, the impact energy is further dispersed at the time of being transmitted to the vehicle body reinforcing structure 100 so as to improve the structural strength of the battery protection device.

According to an example, the projections of the side surfaces of the battery protection structure 200, the vehicle body reinforcing structure 100, and at least one of the first support member 220 and the second support member 230 encircle to form a triangular shape. In other words, taking a vertical plane that is orthogonal to the extending direction of the battery protection structure 200 as a reference plane, the projections of the battery protection structure 200, the vehicle body reinforcing structure 100, and at least one of the first support member 220 and the second support member 200 on the reference plane encircle to form the triangular shape. It is noted that at least the following arraignments are included. The first arrangement is that the projections of the side surfaces of the first support member 220, the battery protection structure 200, and the vehicle body reinforcing structure 100 encircle to form the triangular shape. The second arrangement is that the projections of the side surfaces of the second support member 230, the battery protection structure 200, and the vehicle body reinforcing structure 100 encircle to form the triangular shape. The third arrangement is that the projections of the side surfaces of the first support member 220, the second support member 230, the battery protection structure 200, and the vehicle body reinforcing structure 100 encircle to form the triangular shape. The fourth arrangement is that the projections of the side surfaces of the first support member 220, the battery protection structure 200, and the vehicle body reinforcing structure 100 encircle to form a first triangular shape, and the projections of the side surfaces of the second support member 230, the battery protection structure 200, and the vehicle body reinforcing structure 100 encircle to form a second triangular shape.

According to an example, when the battery protection device is installed at the rear side of the battery pack, both of the extending directions of the battery protection structure 200 and the vehicle body reinforcing structure 100 are the left-right direction, that is, the reference plane is the vertical plane, and the normal direction of the reference plane is the left-right direction. In the reference plane, the projections of the battery protection structure 200, the vehicle body reinforcing structure 100, and at least one of the first support member 220 and the second support member 230 encircle to form the triangular shape. In FIG. 3, the projections of the side surfaces of the second support member 230, the battery protection structure 200, and the vehicle body reinforcing structure 100 encircle to form the triangular shape.

According to the above-described arrangements, when the battery protection device receives the collision, the side of the battery protection device that is far from the battery pack is collided at first, and the impact energy due to the collision is transmitted to the direction of the vehicle body reinforcing structure 100 via the battery protection structure 200. In this direction, the battery protection structure 200, the vehicle body reinforcing structure 100, and at least one of the first support member 200 and the second support member 230 form the triangular structure. Since the triangular structure has the relatively strong stability, the structural strength of the battery protection device in this direction becomes stronger such that it is more suitable for the protection of the battery pack.

Both the first support member 220 and the second support member 230 may adopt the structure types of the plate-shaped structure, the rod-shaped structure and the like. The first support member 220 and the second support member 230 may adopt the same type of structure, and the first support member 220 and the second support member 230 may adopt different types of structure. The number of the first support member 220 and the second support member 230 may be single or multiple, and the number of the first support member 220 and the number of the second support member 230 may be the same or different from each other.

The first support member 220 and/or the second support member 230 have the reinforcing ribs. In other words, it is possible to provide the reinforcing rib only in the first support member 220, it is possible to provide the reinforcing rib only in the second support member 230, and it is possible to provide the reinforcing ribs in both of the first support member 220 and the second support member 230. The reinforcing ribs can strengthen the structural strength of the first support member 220 and/or the second support member 230 in which the reinforcing ribs are provided.

As an example, according to a specific configuration, the first support member 220 is formed in the plate-shaped structure and has the reinforcing rib, wherein the reinforcing rib is formed as the convex portion 221. The convex portion 221 is provided to extend from the end of the first support member connected with the battery protection structure 200 to the end communicating to the vehicle body reinforcing structure 100. The convex portion functions to reinforce the structure on the first support member 220 so as to improve the anti-deformation ability of the battery protection structure 200.

Furthermore, a concave portion corresponding to the convex portion 221 is provided at the other side with respect to the side of the first support member 220 at which the convex portion 221 is provided. Accordingly, the reinforcing rib in the first support member 220 is formed in the arc shape. On one hand, the reinforcing rib formed in the arc shape functions reinforcing the structure, and on the other hand, the reinforcing rib has the concave portion such that a relatively larger deformation can occur in the concave portion so as to absorb a larger impact energy so as to further suitably protect the battery pack.

According to another specific example, the second support member 230 has the reinforcing rib, and the reinforcing rib is the flange 232. As an example, the second support member 230 includes the connection plate 231, and the flanges 232 are provided on the two sides of the connection plate 231 being opposite to each other. One end of the connection plate 231 is connected to the battery protection structure 200, and the other end of the connection plate 231 is connected to the vehicle body reinforcing structure 100, wherein one end of the flange 232 is connected to the battery protection structure 200, and the other end of the flange 232 is connected to the vehicle body reinforcing structure 100. According to the arrangement, on one hand, the arrangement of the flange 232 increases the connection area of the second support member 230 and the vehicle body reinforcing structure 100 and improves the connection strength between the second support member 230 and the vehicle body reinforcing structure 100. Also, the arrangement of the flange 232 increases the connection area of the second support member 230 and the battery protection structure 200 and improves the connection strength between the second support member 230 and the battery protection structure 200. On the other hand, the connection plate 231 and the flanges 232 on the two sides form the concave shape or the arc-shaped structure to improve the structural strength of the second support member 230, and a hollow cavity is formed between the connection plate 231 and the flanges 232 on the two sides so as to improve the buffering effect of the second support member 230.

In the above-described example, the reinforcing rib in the first support member 220 is formed in the arc shape, and the second support member 230 is configured as the flanges 232. In other examples, the reinforcing rib of the first support member 220 may be configured as the flange 232, and the reinforcing rib of the second support member 230 may be formed in the arc shape. Or, the reinforcing rib in the first support member 220 and the reinforcing rib in the second support member 230 may adopt the same type of structure.

According to an example, the covering portions 223 are respectively provided at two ends of the first support member 220, the covering portion 223 at the first end of the first support member 220 covers the surface of the battery protection structure 200 to increase the connection area of the first support member 220 and the battery protection structure 200, and the covering portion 223 at the second end of the first support member 220 covers the surface of the first reinforcing structure 110 or the second reinforcing structure 120 to increase the connection area of the first support member 220 and the first reinforcing structure 110 or the second reinforcing structure 120 to which the first support member 220 is connected. Accordingly, the connection strength of the first support member 220 with the battery protection structure 200 and the first reinforcing structure 110 or the second reinforcing structure 120. As an example, the first support member 220 is connected to the second reinforcing structure 120 and the battery protection structure 200 respectively, and the structure of the second reinforcing structure 120 and the battery protection structure 200 for connecting the first support member is formed in the round-rod shape. Accordingly, both the covering portions 223 at the two ends of the first support member 220 have the arc surfaces. The first support member 220 covers the partial area on the side surface of the battery protection structure 200 by the arc surface of the covering portion 223 on one end of the first support member 220 to increase the contact area with the battery protection structure 200 and improve the connection strength between the first support member 220 and the battery protection structure 200. The first support member 220 covers the partial area on the side surface of the second reinforcing structure 120 by the arc surface of the covering portion on the other end of the first support member 220 to increase the contact area with the second reinforcing structure 120 so as to increase the connection strength between the first support member 220 and the second reinforcing structure 120. At the same time, the contact area between the first support member 220 and the second reinforcing structure 120 increases such that the impact energy transmitted to the second reinforcing structure 120 via the first support member 120 is further dispersed and it is possible to make the force received by the second reinforcing structure 120 to be relatively more uniform.

According to another example, the covering portions 223 may be provided at the two ends of the second support member 230, the arrangement of the covering portions 223 may be referred to the above-described arrangement of the covering portions 223 provided in the first support member 220.

According to an example, the battery protection structure 200 includes the central section 211 extending along the length direction of the battery pack, and side sections 212 extending from the two ends of the central section 211 in the direction toward the battery pack, wherein the central section 211 and the two side sections 212 configure the U-shaped structure. The side sections 212 are provided between the central section 211 and the vehicle body reinforcing structure 100, the side sections 212 are connected to the vehicle body reinforcing structure 100, and there is a certain gap between the central section 211 and the vehicle body reinforcing structure 100. Accordingly, by configuring the battery protection structure 200 in the structure of including the side sections 212 and the central section 211, it is possible to increase the distance between the central section 211 and the battery pack so as to increase the collapsing space of the battery protection structure 200 and improve the buffering effect.

According to an optional example, the above-described U-shaped structure is an integrated structure such that an extra assembly is unnecessary and it is possible to perform the operations of directly installing the integrated U-shaped structure on the vehicle body reinforcing structure 100. Accordingly, the assembly processing is simplified and the assembly efficiency is improved.

According to a possible example, the transition surface between the central section 211 and the side sections 212 is the arc surface. The arrangement of the arc surface can suppress the stress concentration occurred in the transition portion between the central section 211 and the side sections 212 after the central section 211 is collided so as to improve the structural stability of the battery protection structure 200.

According to an example, the side sections 212 are configured to be inclined in a direction to approach the battery pack from the lower side toward the upper side at the two ends of the central section 211. In other words, the battery protection structure 200 is configured to be inclined to be separated from the battery pack from the upper side toward the lower side (as shown in FIG. 3). Due to the inclination arrangement of the side sections 212, the central section 211 is positioned at the outside that is relatively farther to the battery pack and the central section 211 is located at the position lower than the connection point of the side sections 212 and the vehicle body reinforcing structure 100. The central section 211 is located at the lower position such that the distance to the ground is relatively closer and the protruding object on the ground can collide with the battery protection structure 200 before colliding with the battery pack. Accordingly, it is possible to buffer the impact and protect the battery pack by configuring the battery protection structure 200 and the vehicle body reinforcing structure 100. Furthermore, when the vehicle moves forward or reverses, the impact energy by the protruding object on the ground to the battery protection structure is almost in the front-rear direction such that the battery protection structure 200 configured to be inclined toward the lower side can increase the collapsing space in the direction of the impact energy for realizing a better buffering effect. According to an example, the horizontal plane in which the lowest point of the battery protection structure 200 is located is lower than the horizontal plane in which the lowest point of the battery pack is located. According to the arrangement, on one hand, at the time of receiving the collision of the protruding object at the upper side of the ground in the bottom portion of the vehicle body, the battery protection structure 200 is closer to the ground so as to receive the collision before the battery pack and improves the effectiveness of protecting the battery pack by the battery protection structure 200. On the other hand, at the time of receiving the collision, the battery protection structure 200 moves toward the region at the lower side of the battery pack after being deformed rather than directly moving toward the side surface of the battery pack so as to further effectively protect the battery pack.

According to an example, the battery protection structure 200 includes a weight-reduction cavity. The arrangement of the weight-reduction cavity can reduce the weight of the battery protection structure 200 so as to reduce the gross weight of the electric vehicle. Also, the arrangement of the weight-reduction cavity inside the battery protection structure 200 increases the deformation amount of the battery protection structure 200 during the collision. That is, the arrangement of the weight-reduction cavity inside the battery protection structure 200 increases the energy absorbed when the battery protection structure 200 is collapsed during the collision so as to improve the buffering effect of the battery protection structure 200. A single weight-reduction cavity or a plurality of weight-reduction cavities may be provided inside the battery protection structure 200. When the number of the weight-reduction cavities is multiple, the plurality of weight-reduction cavities are disposed at intervals in the length direction of the battery protection structure 200, and the partition reinforcing ribs are formed between the adjacent weight-reduction cavities.

As shown in FIG. 1, according to an example, the battery protection structure 200 includes the integrated U-shaped structure, and more specifically, the integrated U-shaped structure is a U-shaped hollow rod. In other words, the integrated U-shaped structure is formed in the rod shape while being hollow. A cavity is formed inside the U-shaped hollow rod, and the cavity is the weight-reduction cavity. According to the above-described configuration, the arrangement of the U-shaped hollow rod can realize the integrated configuration of the U-shaped structure while reducing the weight and reducing the cost.

According to an example, the battery protection structure 200 further includes the connection member 240, and the two ends of the battery protection structure 200 are connected to the vehicle body reinforcing structure 100 via the connection member 240, respectively. According to the arrangement of the connection member 240, it is possible to directly connect and fix the battery protection structure 200 with the vehicle body reinforcing structure 100.

The two ends of the battery protection structure 200 are connected to the two ends of the vehicle body reinforcing structure 100, respectively. In other words, the first end of the battery protection structure 200 is connected to the first end of the vehicle body reinforcing structure 100 via one connection member 240, and the second end of the battery protection structure 200 is connected to the second end of the vehicle body reinforcing structure 100 via another connection member 240. The connection member 240 and the battery protection structure 200, and the connection member 240 and the vehicle body reinforcing structure 100 may be fixed by welding. When the battery protection structure 200 includes the U-shaped hollow rod, the connection member 240 includes a sleeve-shaped fixing body and a connection body located on the side surface of the sleeve-shaped fixing body. The sleeve-shaped fixing body is sleeved on the end portion of the U-shaped hollow rod, and the sleeve-shaped fixing body is connected and fixed to the U-shaped hollow rod. The connection body is provided to extend outwardly from the outer surface of the sleeve-shaped fixing body. The connection body includes an arc surface, and the connection body covers the side surface of the vehicle body reinforcing structure 100 by the arc surface thereof so as to increase the connection area of the connection body and the vehicle body reinforcing structure 100 and improve the connection strength.

According to an example, the battery protection device includes the vehicle body reinforcing structure 100 and the battery protection structure 200. The vehicle body reinforcing structure 100 is installed in the rear portion of the battery pack. The vehicle body reinforcing structure 100 includes the first reinforcing structure 110, the second reinforcing structure 120, and the connection bracket 130. The first reinforcing structure 110 includes the first reinforcing rod 111 and the second reinforcing rod 112, wherein the first reinforcing rod 111 and the second reinforcing rod 112 intersects each other to form the cross-connection portion 113. The second reinforcing structure 120 includes the reinforcing portion, and more specifically, the reinforcing portion is the crossbar. The left ends and the right ends of the first reinforcing rod 111, the second reinforcing rod 112, and the crossbar are connected to the left side and the right side of the vehicle body, respectively. All of the first reinforcing rod 111, the second reinforcing rod 112, and the crossbar are connected with the connection bracket 130. The top portion of the connection bracket 130 is connected with the crossbar of the vehicle body, and the bottom portion of the connection bracket 130 is connected with the battery pack. The battery protection structure 200 includes the U-shaped hollow rod that is inclined outwardly from the upper side toward the lower side. The left end and the right end of the U-shaped hollow rod are fixed at the positions on the crossbar being close to the left end and the right end of the crossbar by the connection member 240. The horizontal plane in which the lowest point of the U-shaped hollow rod is located is lower than the horizontal plane in which the lowest point of the battery pack is located. The battery protection device further includes the first support member 220 and the second support member 230. The two ends of the first support member 220 are connected to the central portion of the connection crossbar and the central portion of the U-shaped hollow rod, respectively. The number of the second support members 230 is two, wherein one second support members 230 is connected to the left region of the second reinforcing rod 112 and the left region of the U-shaped hollow rod, and the other second support member 230 is connected to the right region of the first reinforcing rod 111 and the right region of the U-shaped hollow rod.

The battery protection device according to the above-described embodiment is applied in the vehicle. During the driving of the vehicle, at the time of receiving the collision of the protruding object on the ground, the U-shaped hollow rod is collided at first, then the U-shaped hollow rod is collapsed to absorb the impact energy and transmits the impact energy to the vehicle body via the two end portions of the U-shaped hollow rod, the first support member 220 and the second support member 230. Accordingly, the impact energy is reduced and dispersed during the process when the impact energy is transmitted from the U-shaped hollow rod to the vehicle body reinforcing structure 100. The vehicle body reinforcing structure 100 further disperses the impact energy to the vehicle body by the connection points between the vehicle body reinforcing structure 100 itself and the vehicle body, and the vehicle body reinforcing structure 100 is also collapsed to absorb the impact energy so as to further reduce the impact energy in the direction toward the battery pack. Accordingly, after the collision, the impact energy is dispersed and absorbed by the battery protection structure 200 and the vehicle body reinforcing structure 100 before the impact energy reaches the battery pack so as to be significantly reduced or totally dispersed and absorbed, thus the battery pack can be effectively protected.

An electric vehicle according to an embodiment of the present disclosure is provided, wherein the electric vehicle includes the vehicle body, the battery pack and the battery protection device according to any one of the above-described examples. The electric vehicle is provided with the battery protection device according to any one of the above-described examples such that the battery protection device provides better buffering effect with respect to the battery pack and protects the battery pack more suitably.

As shown in FIG. 1, a battery protection device according to an embodiment of the present disclosure is provided, wherein the battery protection device is applied in the vehicle and the vehicle may be a hybrid vehicle or a pure electric vehicle. The vehicle includes a vehicle body and a battery pack, wherein the battery pack is arranged inside the vehicle body and the battery protection device is installed in the vehicle body. The battery protection device includes a vehicle body reinforcing structure 100 and a battery protection structure 200. The vehicle body reinforcing structure 100 is provided on the side surface of the battery pack and the vehicle body reinforcing structure 100 extends along a length direction of either side surface of the battery pack. Two ends of the vehicle body reinforcing structure 100 are fixed to the vehicle body respectively, and the battery protection structure 200 is installed at the side of the vehicle body reinforcing structure 100 being far from the battery pack.

The vehicle body reinforcing structure 100 is arranged on the side surface of the battery pack and the battery protection structure 200 is installed on the side of the vehicle body reinforcing structure 100 that is far from the battery pack 100. Thus, at the time of encountering the obstacle object (for example, the protruding object on the ground) moving from the lateral side toward the battery pack, the configuration colliding with the obstacle object is the battery protection structure 200. When the impact energy is relatively small, the battery protection structure 200 resists the impact energy by the structural strength of the battery protection structure 200 itself so as to block the transmission of the impact energy further to the direction of the battery pack. When the impact energy is relatively large, the battery protection structure 200 will be collapsed and deformed after receiving the impact to absorb part of the impact energy such that the impact energy transmitted to the vehicle body reinforcing structure 100 is relatively weaken and the vehicle body reinforcing structure 100 resists the impact energy by the structural strength of the vehicle body reinforcing structure 100 itself so as to block the transmission of the impact energy further to the direction of the battery pack. When the impact energy is further larger, before the impact energy is transmitted to the battery pack, the battery protection structure 200 and the vehicle body reinforcing structure 100 are respectively collapsed to absorb part of the impact energy so as to significantly weaken the impact energy transmitted to the battery pack, and thus protect the battery pack more suitably.

In the vehicle, the vehicle body reinforcing structure 100 may be installed on either side of the battery pack. For example, the vehicle body reinforcing structure 100 may be installed on the front side, rear side, left side, right side, upper side, and the lower side of the battery pack. During the driving of the vehicle, since the movement velocity of driving forward or reversing is relatively larger than other situations and it is considerable that the impact energy received by the battery pack will be relatively larger, the vehicle body reinforcing structure 100 will be preferably installed on the front side or the rear side of the battery pack.

According to an example, the battery pack is installed at the bottom side of the rear portion of the vehicle body. The vehicle body reinforcing structure 100 is arranged at the rear side of the battery pack, and the vehicle body reinforcing structure 100 extends along the left-right direction of the battery pack. The left end and the right end of the vehicle body reinforcing structure 100 are connected to the left side and the right side of the vehicle body. According to this arrangement, it is possible for the vehicle body reinforcing structure 100 to disperse part of the impact energy to the vehicle body through the connection with the vehicle body to further protect the battery pack.

According to an example, the vehicle body reinforcing structure 100 does not communicate with the battery pack. At this time, the transmission chain of the impact energy is from the battery protection structure 100 to the vehicle body reinforcing structure 100, the vehicle body, and the battery pack in this sequence. Compared with the configuration of directly connecting the battery pack with the battery protection structure according to the conventional technology, the battery protection device provided in the present embodiment can extend the transmission chain of the impact energy to make the impact energy to be absorbed during the transmission chain so as to achieve the goal of improving the protection effect of the battery protection device with respect to the battery pack.

According to an example, the vehicle body reinforcing structure 100 is connected with the battery pack. In other words, the vehicle body reinforcing structure 100 is connected with the vehicle body and the battery pack respectively. When the impact energy is transmitted to the vehicle body reinforcing structure, the vehicle body reinforcing structure transmits the impact energy to the vehicle body and the battery pack respectively. According to this arrangement, on one hand, at this time, the transmission chain of the impact energy is from the battery protection structure 200 to the vehicle body reinforcing structure 100, the vehicle body, and the battery pack in this sequence. By indirectly connecting the battery pack and the battery protection structure 200, compared with the configuration of directly connecting the battery pack and the battery protection structure according to the conventional technology, the battery protection device provided in the present embodiment can extend the transmission chain of the impact energy to make the impact energy to be absorbed during the transmission chain so as to achieve the goal of improving the protection effect of the battery protection device with respect to the battery pack. On the other hand, the stability of the connection of the battery pack can be improved by the connection between the vehicle body reinforcing structure 100 and the battery pack so as to avoid the collision from occurring between the battery pack and the vehicle body due to the shaking of the battery pack with respect to the vehicle body.

As shown in FIG. 1 to FIG. 3, according to an example, the vehicle body reinforcing structure 100 includes a first reinforcing structure 110 and a second reinforcing structure 120, and at least one of the first reinforcing structure 110 and the second reinforcing structure 120 is connected with the same battery protection structure 200. In other words, the battery protection structure 200 may be only connected with the first reinforcing structure 110, or the battery protection structure 200 may be only connected with the second reinforcing structure 120, and the battery protection structure 200 may be respectively connected to the first reinforcing structure 110 and the second reinforcing structure 120.

According to a specific arrangement, two ends of the first reinforcing structure 110 are connected with the two sides of the vehicle body respectively, and two ends of the second reinforcing structure 120 are connected with the two sides of the vehicle body respectively. For example, the left end and the right end of the first reinforcing structure 110 are connected with the left side and the right side of the vehicle body respectively, and the left end and the right end of the second reinforcing structure 120 are connected with the left side and the right side of the vehicle body respectively.

The first reinforcing structure 110 and the second reinforcing structure 120 may be distributed in the front-rear direction, or the first reinforcing structure 110 and the second reinforcing structure 120 may be distributed in the up-down direction. According to other examples, the first reinforcing structure 110 and the second reinforcing structure 120 may be distributed to be inclined with respect to the battery pack, that is, the minimum distance between the first reinforcing structure 110 and the battery pack is different from the minimum distance between the second reinforcing structure 120 and the battery pack.

According to a specific example, both the vehicle body reinforcing structure 100 and the battery protection structure 200 are arranged at the rear side of the battery pack. As shown in FIG. 2, the first reinforcing structure 110 and the second reinforcing structure 120 are distributed in the up-down direction, the second reinforcing structure 120 is provided at the lower side of the first reinforcing structure 110, and the batter protection structure 200 is connected with the second reinforcing structure 120. That is, the connection point of the battery protection structure 200 and the vehicle body reinforcing structure 100 is positioned at a position that is relatively closer to the lower side in the vehicle body reinforcing structure 100. The battery protection structure 200 is configured to mainly buffer the impact that may be received by the region at the lower side of the battery pack. Thus, by installing the battery protection structure 200 at the position that is relatively closer to the lower side in the vehicle body reinforcing structure 100, it is possible to make the distance between the connection portion of the battery protection structure 200 and the vehicle body reinforcing structure 100 and the portion of the battery protection structure 200 where it is most likely to receive the impact in the battery protection structure 200 to be relatively shorter than that in other situations so as to improve the connection stability of the battery protection structure 200.

As shown in FIG. 1, according to an example, the two ends of the battery protection structure 200 are connected to the two ends of the vehicle body reinforcing structure 100, respectively. As an example, when the battery protection structure 200 is installed at the rear side of the battery pack, the battery protection structure 200 extends along the length direction of the rear surface of the battery pack. In other words, the battery protection structure 200 extends along the left-right direction, and the left end and the right end of the battery protection structure 200 are connected to the left end and the right end of the second reinforcing structure 120 respectively. According to such an arrangement, when the battery protection structure 200 receives the collision, the battery protection structure 200 is collapsed and at the same time, the impact energy is dispersed to the left side and the right side when being transmitted inside the battery protection structure 200. The impact energy is transmitted to the second reinforcing structure 120 through the connection portions at the left side and the right side so as to make the force received by the vehicle body reinforcing structure 100 at a single point to be relatively smaller.

According to an example, the first reinforcing structure 110 at least includes a cross-connection portion 113, and the second reinforcing structure 120 at least includes a reinforcing portion provided to extend along the length direction of one side surface of the battery pack. The second reinforcing structure 120 is positioned at the lower side of the first reinforcing structure 110.

According to an example, the first reinforcing structure 110 is connected with the second reinforcing structure 120 to improve the overall structural strength of the vehicle body reinforcing structure 100 such that it is possible for the vehicle body reinforcing structure 100 to resist a larger impact energy. The two ends of the first reinforcing structure 110 may be connected to the two ends of the second reinforcing structure 120, respectively. The two ends after the first reinforcing structure 110 and the second reinforcing structure 120 are connected are connected to the two sides of the vehicle body, respectively.

According to another example, the battery protection device further includes a connection bracket 130, wherein the two ends of the first reinforcing structure 110 are connected to the two sides of the vehicle body, and the two ends of the second reinforcing structure 120 are connected to the two sides of the vehicle body. The first reinforcing structure 110 and the second reinforcing structure 120 are connected with each other via the connection bracket 130, and the connection bracket 130 is connected with the vehicle body. According to such an arrangement, on one hand, the connection bracket 130 connects the first reinforcing structure 110 with the second reinforcing structure 120, and on the other hand, the connection bracket 130 increases the connection points between the vehicle body reinforcing structure 100 and the vehicle body. Accordingly, the connection bracket 130 improves the connection stability of the battery protection device and the vehicle body and increases the transmission points for the battery protection device to transmit the impact energy to the vehicle body. Furthermore, the connection bracket 130 may be configured to connect the battery pack so as to avoid the shaking of the battery pack and improves the stability of the battery pack during the driving of the vehicle.

As shown in FIG. 1, according to an example, the battery protection structure 200 further includes a first support member 220, wherein the first support member 220 is connected with the battery protection structure 200, and the first support member 220 is connected with at least one of the first reinforcing structure 110 and the second reinforcing structure 120. In other words, the first support member 220 may be connected to the battery protection structure 200 and the first reinforcing structure 110 respectively, or the first support member 220 may be connected to the battery protection structure 200 and the second reinforcing structure 120 respectively, or the first support member 220 may be connected to the battery protection structure 200, the first reinforcing structure 110 and the second reinforcing structure 120 respectively. According to such an arrangement, at the connection portion of the battery protection structure 200 and the vehicle body reinforcing structure 100, besides the two connection portions at the two ends of the battery protection structure 200, at least one connection point is increased between the battery protection structure 200 and the vehicle body reinforcing structure 100 due to the arrangement of the first support member 220. Accordingly, at least one transmission point for transmitting the impact energy is increased so as to further disperse the impact energy transmitted to the vehicle body reinforcing structure 100. Thus, when the collision occurs, the vehicle body reinforcing structure can resist a relatively larger impact energy so as to improve the protection effect with respect to the battery pack. As an example, the connection point of the first support member 200 is positioned at the end portion, wherein one end of the first support member is connected with the battery protection structure 200, and the other end thereof is connected with at least one of the first reinforcing structure 110 and the second reinforcing structure 120.

Furthermore, the battery protection device further includes a second support member 230, wherein the second support member 230 is connected with the battery protection structure 200, the second support member 230 is connected with at least one of the first reinforcing structure 110 and the second reinforcing structure 120. As an example, the connection point of the second support member 230 is positioned at the end portion thereof, wherein one end of the second support member 230 is connected with the battery protection structure 200, and the other end of the second support member 230 is connected with at least one of the first reinforcing structure 110 and the second reinforcing structure 120.

In other words, when the battery protection device includes both the first support member 220 and the second support member 230, either of the first support member 220 and the second member 230 has one end that is connected with the battery protection structure 200, and there are several possible arrangements among the other end of the first support member 220, the other end of the second support member 230, the first reinforcing structure 110, and the second reinforcing structure 120 at least as shown below.

The first arrangement is that the first support member 220 is connected with the first reinforcing structure 110, and the second support member 230 is connected with the second reinforcing structure 120.

The second arrangement is that the first support member 220 is connected with the second reinforcing structure 120, and the second support member 230 is connected with the first reinforcing structure 110.

The third arrangement is that the first support member is connected with the first reinforcing structure 110, and the second support member 230 is connected with the first reinforcing structure 110 and the second reinforcing structure 120 respectively.

The fourth arrangement is that the first support member 220 is connected with the second reinforcing structure 120, and the second support member 230 is connected with the first reinforcing structure 110 and the second reinforcing structure 120 respectively.

The fifth arrangement is that the first support member 220 is connected with the first reinforcing structure 110 and the second reinforcing structure 120 respectively, and the second support member is connected with the first reinforcing structure 110 and the second reinforcing structure 120 respectively.

According to the variable arrangements shown above, the second support member 230 is added to further increase the connection points between the battery protection structure 200 and the vehicle body reinforcing structure 100 so as to further increase the transmission points of the impact energy. Accordingly, the impact energy is further dispersed at the time of being transmitted to the vehicle body reinforcing structure 100 so as to improve the structural strength of the battery protection device.

According to an example, the projections of the side surfaces of the battery protection structure 200, the vehicle body reinforcing structure 100, and at least one of the first support member 220 and the second support member 230 encircle to form a triangular shape. In other words, taking a vertical plane that is orthogonal to the extending direction of the battery protection structure 200 as a reference plane, the projections of the battery protection structure 200, the vehicle body reinforcing structure 100, and at least one of the first support member 220 and the second support member 200 on the reference plane encircle to form the triangular shape. It is noted that at least the following arraignments are included. The first arrangement is that the projections of the side surfaces of the first support member 220, the battery protection structure 200, and the vehicle body reinforcing structure 100 encircle to form the triangular shape. The second arrangement is that the projections of the side surfaces of the second support member 230, the battery protection structure 200, and the vehicle body reinforcing structure 100 encircle to form the triangular shape. The third arrangement is that the projections of the side surfaces of the first support member 220, the second support member 230, the battery protection structure 200, and the vehicle body reinforcing structure 100 encircle to form the triangular shape. The fourth arrangement is that the projections of the side surfaces of the first support member 220, the battery protection structure 200, and the vehicle body reinforcing structure 100 encircle to form a first triangular shape, and the projections of the side surfaces of the second support member 230, the battery protection structure 200, and the vehicle body reinforcing structure 100 encircle to form a second triangular shape.

According to an example, when the battery protection device is installed at the rear side of the battery pack, both of the extending directions of the battery protection structure 200 and the vehicle body reinforcing structure 100 are the left-right direction, that is, the reference plane is the vertical plane, and the normal direction of the reference plane is the left-right direction. In the reference plane, the projections of the battery protection structure 200, the vehicle body reinforcing structure 100, and at least one of the first support member 220 and the second support member 230 encircle to form the triangular shape. In FIG. 3, the projections of the side surfaces of the second support member 230, the battery protection structure 200, and the vehicle body reinforcing structure 100 encircle to form the triangular shape.

According to the above-described arrangements, when the battery protection device receives the collision, the side of the battery protection device that is far from the battery pack is collided at first, and the impact energy due to the collision is transmitted to the direction of the vehicle body reinforcing structure 100 via the battery protection structure 200. In this direction, the battery protection structure 200, the vehicle body reinforcing structure 100, and at least one of the first support member 200 and the second support member 230 form the triangular structure. Since the triangular structure has the relatively strong stability, the structural strength of the battery protection device in this direction becomes stronger such that it is more suitable for the protection of the battery pack.

Both the first support member 220 and the second support member 230 may adopt the structure types of the plate-shaped structure, the rod-shaped structure and the like. The first support member 220 and the second support member 230 may adopt the same type of structure, and the first support member 220 and the second support member 230 may adopt different types of structure. The number of the first support member 220 and the second support member 230 may be single or multiple, and the number of the first support member 220 and the number of the second support member 230 may be the same or different from each other.

The first support member 220 and/or the second support member 230 have the reinforcing ribs. In other words, it is possible to provide the reinforcing rib only in the first support member 220, it is possible to provide the reinforcing rib only in the second support member 230, and it is possible to provide the reinforcing ribs in both of the first support member 220 and the second support member 230. The reinforcing ribs can strengthen the structural strength of the first support member 220 and/or the second support member 230 in which the reinforcing ribs are provided.

As an example, according to a specific configuration, the first support member 220 is formed in the plate-shaped structure and has the reinforcing rib, wherein the reinforcing rib is formed as the convex portion 221. The convex portion 221 is provided to extend from the end of the first support member connected with the battery protection structure 200 to the end communicating to the vehicle body reinforcing structure 100. The convex portion functions to reinforce the structure on the first support member 220 so as to improve the anti-deformation ability of the battery protection structure 200.

Furthermore, a concave portion corresponding to the convex portion 221 is provided at the other side with respect to the side of the first support member 220 at which the convex portion 221 is provided. Accordingly, the reinforcing rib in the first support member 220 is formed in the arc shape. On one hand, the reinforcing rib formed in the arc shape functions reinforcing the structure, and on the other hand, the reinforcing rib has the concave portion such that a relatively larger deformation can occur in the concave portion so as to absorb a larger impact energy so as to further suitably protect the battery pack.

According to another specific example, the second support member 230 has the reinforcing rib, and the reinforcing rib is the flange 232. As an example, the second support member 230 includes the connection plate 231, and the flanges 232 are provided on the two sides of the connection plate 231 being opposite to each other. One end of the connection plate 231 is connected to the battery protection structure 200, and the other end of the connection plate 231 is connected to the vehicle body reinforcing structure 100, wherein one end of the flange 232 is connected to the battery protection structure 200, and the other end of the flange 232 is connected to the vehicle body reinforcing structure 100. According to the arrangement, on one hand, the arrangement of the flange 232 increases the connection area of the second support member 230 and the vehicle body reinforcing structure 100 and improves the connection strength between the second support member 230 and the vehicle body reinforcing structure 100. Also, the arrangement of the flange 232 increases the connection area of the second support member 230 and the battery protection structure 200 and improves the connection strength between the second support member 230 and the battery protection structure 200. On the other hand, the connection plate 231 and the flanges 232 on the two sides form the concave shape or the arc-shaped structure to improve the structural strength of the second support member 230, and a hollow cavity is formed between the connection plate 231 and the flanges 232 on the two sides so as to improve the buffering effect of the second support member 230.

In the above-described example, the reinforcing rib in the first support member 220 is formed in the arc shape, and the second support member 230 is configured as the flanges 232. In other examples, the reinforcing rib of the first support member 220 may be configured as the flange 232, and the reinforcing rib of the second support member 230 may be formed in the arc shape. Or, the reinforcing rib in the first support member 220 and the reinforcing rib in the second support member 230 may adopt the same type of structure.

According to an example, the covering portions 223 are respectively provided at two ends of the first support member 220, the covering portion 223 at the first end of the first support member 220 covers the surface of the battery protection structure 200 to increase the connection area of the first support member 220 and the battery protection structure 200, and the covering portion 223 at the second end of the first support member 220 covers the surface of the first reinforcing structure 110 or the second reinforcing structure 120 to increase the connection area of the first support member 220 and the first reinforcing structure 110 or the second reinforcing structure 120 to which the first support member 220 is connected. Accordingly, the connection strength of the first support member 220 with the battery protection structure 200 and the first reinforcing structure 110 or the second reinforcing structure 120. As an example, the first support member 220 is connected to the second reinforcing structure 120 and the battery protection structure 200 respectively, and the structure of the second reinforcing structure 120 and the battery protection structure 200 for connecting the first support member is formed in the round-rod shape. Accordingly, both the covering portions 223 at the two ends of the first support member 220 have the arc surfaces. The first support member 220 covers the partial area on the side surface of the battery protection structure 200 by the arc surface of the covering portion 223 on one end of the first support member 220 to increase the contact area with the battery protection structure 200 and improve the connection strength between the first support member 220 and the battery protection structure 200. The first support member 220 covers the partial area on the side surface of the second reinforcing structure 120 by the arc surface of the covering portion on the other end of the first support member 220 to increase the contact area with the second reinforcing structure 120 so as to increase the connection strength between the first support member 220 and the second reinforcing structure 120. At the same time, the contact area between the first support member 220 and the second reinforcing structure 120 increases such that the impact energy transmitted to the second reinforcing structure 120 via the first support member 120 is further dispersed and it is possible to make the force received by the second reinforcing structure 120 to be relatively more uniform.

According to another example, the covering portions 223 may be provided at the two ends of the second support member 230, the arrangement of the covering portions 223 may be referred to the above-described arrangement of the covering portions 223 provided in the first support member 220.

According to an example, the battery protection structure 200 includes the central section 211 extending along the length direction of the battery pack, and side sections 212 extending from the two ends of the central section 211 in the direction toward the battery pack, wherein the central section 211 and the two side sections 212 configure the U-shaped structure. The side sections 212 are provided between the central section 211 and the vehicle body reinforcing structure 100, the side sections 212 are connected to the vehicle body reinforcing structure 100, and there is a certain gap between the central section 211 and the vehicle body reinforcing structure 100. Accordingly, by configuring the battery protection structure 200 in the structure of including the side sections 212 and the central section 211, it is possible to increase the distance between the central section 211 and the battery pack so as to increase the collapsing space of the battery protection structure 200 and improve the buffering effect.

According to an optional example, the above-described U-shaped structure is an integrated structure such that an extra assembly is unnecessary and it is possible to perform the operations of directly installing the integrated U-shaped structure on the vehicle body reinforcing structure 100. Accordingly, the assembly processing is simplified and the assembly efficiency is improved.

According to a possible example, the transition surface between the central section 211 and the side sections 212 is the arc surface. The arrangement of the arc surface can suppress the stress concentration occurred in the transition portion between the central section 211 and the side sections 212 after the central section 211 is collided so as to improve the structural stability of the battery protection structure 200.

According to an example, the side sections 212 are configured to be inclined in a direction to approach the battery pack from the lower side toward the upper side at the two ends of the central section 211. In other words, the battery protection structure 200 is configured to be inclined to be separated from the battery pack from the upper side toward the lower side (as shown in FIG. 3). Due to the inclination arrangement of the side sections 212, the central section 211 is positioned at the outside that is relatively farther to the battery pack and the central section 211 is located at the position lower than the connection point of the side sections 212 and the vehicle body reinforcing structure 100. The central section 211 is located at the lower position such that the distance to the ground is relatively closer and the protruding object on the ground can collide with the battery protection structure 200 before colliding with the battery pack. Accordingly, it is possible to buffer the impact and protect the battery pack by configuring the battery protection structure 200 and the vehicle body reinforcing structure 100. Furthermore, when the vehicle moves forward or reverses, the impact energy by the protruding object on the ground to the battery protection structure is almost in the front-rear direction such that the battery protection structure 200 configured to be inclined toward the lower side can increase the collapsing space in the direction of the impact energy for realizing a better buffering effect. According to an example, the horizontal plane in which the lowest point of the battery protection structure 200 is located is lower than the horizontal plane in which the lowest point of the battery pack is located. According to the arrangement, on one hand, at the time of receiving the collision of the protruding object at the upper side of the ground in the bottom portion of the vehicle body, the battery protection structure 200 is closer to the ground so as to receive the collision before the battery pack and improves the effectiveness of protecting the battery pack by the battery protection structure 200. On the other hand, at the time of receiving the collision, the battery protection structure 200 moves toward the region at the lower side of the battery pack after being deformed rather than directly moving toward the side surface of the battery pack so as to further effectively protect the battery pack.

According to an example, the battery protection structure 200 includes a weight-reduction cavity. The arrangement of the weight-reduction cavity can reduce the weight of the battery protection structure 200 so as to reduce the gross weight of the electric vehicle. Also, the arrangement of the weight-reduction cavity inside the battery protection structure 200 increases the deformation amount of the battery protection structure 200 during the collision. That is, the arrangement of the weight-reduction cavity inside the battery protection structure 200 increases the energy absorbed when the battery protection structure 200 is collapsed during the collision so as to improve the buffering effect of the battery protection structure 200. A single weight-reduction cavity or a plurality of weight-reduction cavities may be provided inside the battery protection structure 200. When the number of the weight-reduction cavities is multiple, the plurality of weight-reduction cavities are disposed at intervals in the length direction of the battery protection structure 200, and the partition reinforcing ribs are formed between the adjacent weight-reduction cavities.

As shown in FIG. 1, according to an example, the battery protection structure 200 includes the integrated U-shaped structure, and more specifically, the integrated U-shaped structure is a U-shaped hollow rod. In other words, the integrated U-shaped structure is formed in the rod shape while being hollow. A cavity is formed inside the U-shaped hollow rod, and the cavity is the weight-reduction cavity. According to the above-described configuration, the arrangement of the U-shaped hollow rod can realize the integrated configuration of the U-shaped structure while reducing the weight and reducing the cost.

According to an example, the battery protection structure 200 further includes the connection member 240, and the two ends of the battery protection structure 200 are connected to the vehicle body reinforcing structure 100 via the connection member 240, respectively. According to the arrangement of the connection member 240, it is possible to directly connect and fix the battery protection structure 200 with the vehicle body reinforcing structure 100.

The two ends of the battery protection structure 200 are connected to the two ends of the vehicle body reinforcing structure 100, respectively. In other words, the first end of the battery protection structure 200 is connected to the first end of the vehicle body reinforcing structure 100 via one connection member 240, and the second end of the battery protection structure 200 is connected to the second end of the vehicle body reinforcing structure 100 via another connection member 240. The connection member 240 and the battery protection structure 200, and the connection member 240 and the vehicle body reinforcing structure 100 may be fixed by welding. When the battery protection structure 200 includes the U-shaped hollow rod, the connection member 240 includes a sleeve-shaped fixing body and a connection body located on the side surface of the sleeve-shaped fixing body. The sleeve-shaped fixing body is sleeved on the end portion of the U-shaped hollow rod, and the sleeve-shaped fixing body is connected and fixed to the U-shaped hollow rod. The connection body is provided to extend outwardly from the outer surface of the sleeve-shaped fixing body. The connection body includes an arc surface, and the connection body covers the side surface of the vehicle body reinforcing structure 100 by the arc surface thereof so as to increase the connection area of the connection body and the vehicle body reinforcing structure 100 and improve the connection strength.

According to an example, the battery protection device includes the vehicle body reinforcing structure 100 and the battery protection structure 200. The vehicle body reinforcing structure 100 is installed in the rear portion of the battery pack. The vehicle body reinforcing structure 100 includes the first reinforcing structure 110, the second reinforcing structure 120, and the connection bracket 130. The first reinforcing structure 110 includes the first reinforcing rod 111 and the second reinforcing rod 112, wherein the first reinforcing rod 111 and the second reinforcing rod 112 intersects each other to form the cross-connection portion 113. The second reinforcing structure 120 includes the reinforcing portion, and more specifically, the reinforcing portion is the crossbar. The left ends and the right ends of the first reinforcing rod 111, the second reinforcing rod 112, and the crossbar are connected to the left side and the right side of the vehicle body, respectively. All of the first reinforcing rod 111, the second reinforcing rod 112, and the crossbar are connected with the connection bracket 130. The top portion of the connection bracket 130 is connected with the crossbar of the vehicle body, and the bottom portion of the connection bracket 130 is connected with the battery pack. The battery protection structure 200 includes the U-shaped hollow rod that is inclined outwardly from the upper side toward the lower side. The left end and the right end of the U-shaped hollow rod are fixed at the positions on the crossbar being close to the left end and the right end of the crossbar by the connection member 240. The horizontal plane in which the lowest point of the U-shaped hollow rod is located is lower than the horizontal plane in which the lowest point of the battery pack is located. The battery protection device further includes the first support member 220 and the second support member 230. The two ends of the first support member 220 are connected to the central portion of the connection crossbar and the central portion of the U-shaped hollow rod, respectively. The number of the second support members 230 is two, wherein one second support members 230 is connected to the left region of the second reinforcing rod 112 and the left region of the U-shaped hollow rod, and the other second support member 230 is connected to the right region of the first reinforcing rod 111 and the right region of the U-shaped hollow rod.

The battery protection device according to the above-described embodiment is applied in the vehicle. During the driving of the vehicle, at the time of receiving the collision of the protruding object on the ground, the U-shaped hollow rod is collided at first, then the U-shaped hollow rod is collapsed to absorb the impact energy and transmits the impact energy to the vehicle body via the two end portions of the U-shaped hollow rod, the first support member 220 and the second support member 230. Accordingly, the impact energy is reduced and dispersed during the process when the impact energy is transmitted from the U-shaped hollow rod to the vehicle body reinforcing structure 100. The vehicle body reinforcing structure 100 further disperses the impact energy to the vehicle body by the connection points between the vehicle body reinforcing structure 100 itself and the vehicle body, and the vehicle body reinforcing structure 100 is also collapsed to absorb the impact energy so as to further reduce the impact energy in the direction toward the battery pack. Accordingly, after the collision, the impact energy is dispersed and absorbed by the battery protection structure 200 and the vehicle body reinforcing structure 100 before the impact energy reaches the battery pack so as to be significantly reduced or totally dispersed and absorbed, thus the battery pack can be effectively protected.

According to the above-described aspect, the battery protection device is applied in the vehicle, wherein the vehicle body reinforcing structure is installed on the side surface of the battery pack, the vehicle body reinforcing structure is connected with the vehicle body, and the battery protection structure is arranged at the side of the vehicle body reinforcing structure being far from the battery pack. Accordingly, when the vehicle encounters the protruding object on the ground during the driving, the protruding object collides with the battery protection structure at first before colliding with the battery pack. The battery protection structure will be deformed after receiving the impact due to the collision with the protruding object to absorb part of the impact energy. When the impact energy is transmitted to the vehicle body reinforcing structure via the battery protection structure, on one hand, the vehicle body reinforcing structure transmits part of the impact energy to the vehicle body, and on the other hand, the vehicle body reinforcing structure is deformed due to the impact so as to further absorb the impact energy. In other words, before the impact energy is transmitted to the battery pack, the impact energy is partly absorbed by the battery protection structure to be weaken and the weaken impact energy is partly dispersed to the vehicle body at the vehicle body reinforcing structure and partly absorbed by the vehicle body reinforcing structure. Accordingly, the impact energy transmitted to the battery pack is further weaken so as to achieve a suitable buffering effect with respect to the battery pack, and thus the arrangement of the battery protection device realizes the better protection effect with respect to the battery pack.

According to the present aspect of the present disclosure, the electric vehicle includes the battery protection device according to the first aspect, the battery protection device provides the better buffering effect with respect to the battery pack such that it is possible to protect the battery pack more suitably. More specifically, the battery protection device is applied in the vehicle, wherein the vehicle body reinforcing structure is installed on the side surface of the battery pack, the vehicle body reinforcing structure is connected with the vehicle body, and the battery protection structure is arranged at the side of the vehicle body reinforcing structure being far from the battery pack. Accordingly, when the vehicle encounters the protruding object on the ground during the driving, the protruding object collides with the battery protection structure at first before colliding with the battery pack. The battery protection structure will be deformed after receiving the impact due to the collision with the protruding object to absorb part of the impact energy. When the impact energy is transmitted to the vehicle body reinforcing structure via the battery protection structure, on one hand, the vehicle body reinforcing structure transmits part of the impact energy to the vehicle body, and on the other hand, the vehicle body reinforcing structure is deformed due to the impact so as to further absorb the impact energy. In other words, before the impact energy is transmitted to the battery pack, the impact energy is partly absorbed by the battery protection structure to be weaken and the weaken impact energy is partly dispersed to the vehicle body at the vehicle body reinforcing structure and partly absorbed by the vehicle body reinforcing structure. Accordingly, the impact energy transmitted to the battery pack is further weaken so as to achieve a suitable buffering effect with respect to the battery pack, and thus the arrangement of the battery protection device realizes the better protection effect with respect to the battery pack.

According to a specific example, the batter pack is disposed at the rear portion of the vehicle body and at the bottom side of the vehicle body, and the battery protection device is disposed at the rear side of the battery pack. The battery protection device arranged at the rear side of the battery pack can perform the buffering effect more effectively to the collision from the rear side of the battery pack so as to protect the battery pack more suitably.

Although the respective embodiments and modifications of the present disclosure have been described above, the technical scope of the present disclosure is not limited to the above-described embodiments, and configurations in the respective embodiments and modifications within the scope not departing from the spirit of the present disclosure. It is possible to change the combination of elements, make various changes to each configuration element, or delete each configuration element. The present disclosure is not limited by the above description, and is only limited by the appended claims.

REFERENCE SIGNS LIST 100 vehicle body reinforcing structure
110 first reinforcing structure
111 first reinforcing rod
112 second reinforcing rod
113 cross-connection portion
120 second reinforcing structure
130 connection bracket
200 battery protection structure
211 central section
212 side section
220 first support member
221 convex portion
223 covering portion
230 second support portion
231 connection plate
232 flange
240 connection member

What is claimed is:

1. A battery protection device installed in a vehicle, wherein the vehicle includes a vehicle body and a battery pack arranged inside the vehicle body, comprising:
   a vehicle body reinforcing structure provided to extend along a length direction of either side surface of the battery pack, two ends of the vehicle body reinforcing structure are fixed to the vehicle body respectively; and
   a battery protection structure that extends along the length direction of either side surface of the battery pack and is installed on a side of the vehicle body reinforcing structure,
   wherein the battery protection structure includes a central section extending along the length direction of the battery pack and two side sections extending from two ends of the central section toward a direction of the battery pack respectively, and
   wherein the central section and the two side sections form a U-shaped structure.

2. The battery protection device according to claim 1, wherein the vehicle body reinforcing structure includes a first reinforcing structure and a second reinforcing structure, and at least one of the first reinforcing structure and the second reinforcing structure is arranged to communicate with the battery protection structure.

3. The battery protection device according to claim 2, wherein the battery protection device further includes a first support member,
   a first end of the first support member communicates with the battery protection structure, and
   a second end of the first support member communicates with at least one of the first reinforcing structure and the second reinforcing structure.

4. The battery protection device according to claim 3, wherein the battery protection device further includes a second support member,
   a first end of the second support member communicates with the battery protection structure, and
   a second end of the second support member communicates with at least one of the first reinforcing structure and the second reinforcing structure.

5. The battery protection device according to claim 4, wherein projections of side surfaces of at least one of the first support member and the second support member, the battery protection structure and the vehicle body reinforcing structure encircle to form a triangular shape.

6. The battery protection device according to claim 4, wherein the first support member and/or the second support member includes a reinforcing rib.

7. The battery protection device according to claim 2, wherein the first reinforcing structure includes at least a cross-connection portion,
   the second reinforcing structure includes at least a reinforcing portion provided to extend along the length direction of one side surface of the battery pack, and
   the second reinforcing structure is positioned at a lower side of the first reinforcing structure.

8. The battery protection device according to claim 1, wherein the two side sections are arranged from the two ends of the central section to be inclined in a direction from a lower side toward an upper side to approach the battery pack.

9. The battery protection device according to claim 1, wherein the battery protection structure includes a weight-reduction cavity.

10. The battery protection device according to claim 8, wherein a horizontal plane on which the lowest point of the battery protection structure is positioned is at a lower side of a horizontal plane on which the lowest point of the battery pack is positioned.

11. An electric vehicle, comprising:
   a vehicle body; and
   a battery pack installed inside the vehicle body,
   wherein the electric vehicle further includes the battery protection device according to claim 1.

12. A battery protection device installed in a vehicle, wherein the vehicle includes a vehicle body and a battery pack arranged inside the vehicle body, comprising:
   a vehicle body reinforcing structure provided to extend along a length direction of either side surface of the battery pack, two ends of the vehicle body reinforcing structure are fixed to the vehicle body respectively; and
   a battery protection structure that extends along the length direction of either side surface of the battery pack and is installed on a side of the vehicle body reinforcing structure;
   wherein the vehicle body reinforcing structure includes a first reinforcing structure and a second reinforcing structure, at least one of the first reinforcing structure and the second reinforcing structure is arranged to communicate with the battery protection structure, the battery protection device further includes a first support member, a first end of the first support member communicates with the battery protection structure, a second end of the first support member communicates with at least one of the first reinforcing structure and the second reinforcing structure, the battery protection device further includes a second support member, a first end of the second support member communicates with the battery protection structure, and a second end of the second support member communicates with at least one of the first reinforcing structure and the second reinforcing structure, and wherein projections of side surfaces of at least one of the first support member and the second support member, the battery protection structure, and the vehicle body reinforcing structure encircle to form a triangular shape.

13. An electric vehicle, comprising:

a vehicle body; and a battery pack installed inside the vehicle body, wherein the electric vehicle further includes the battery protection device according to claim 12.

\* \* \* \* \*